F. H. RICHARDS.
MECHANISM FOR MAKING TYPE AND TYPE BARS.
APPLICATION FILED MAR. 11, 1903. RENEWED JULY 12, 1910.

976,920.

Patented Nov. 29, 1910.
7 SHEETS—SHEET 2.

Witnesses:

Inventor,

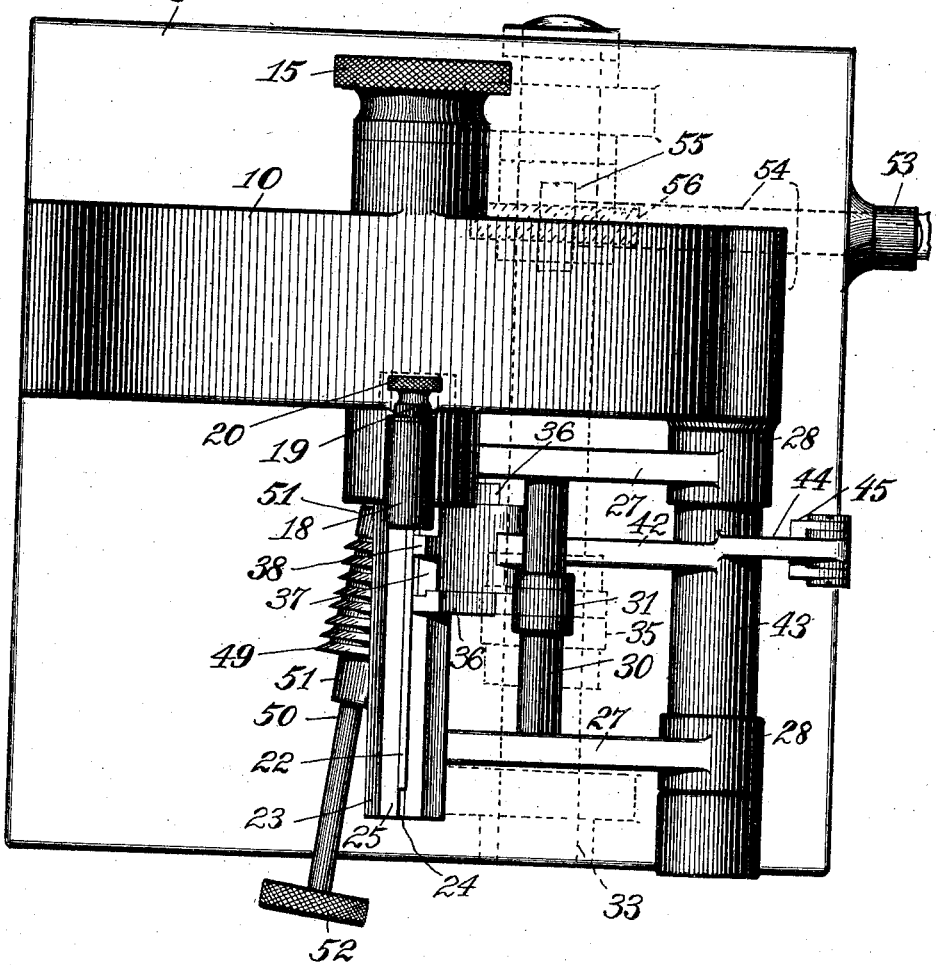

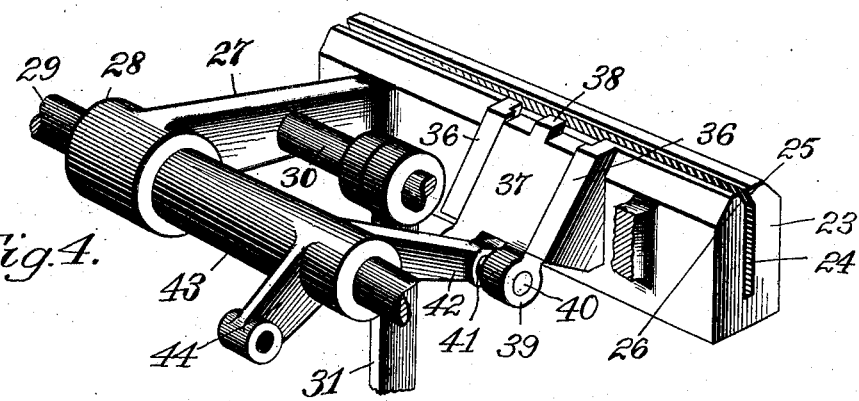
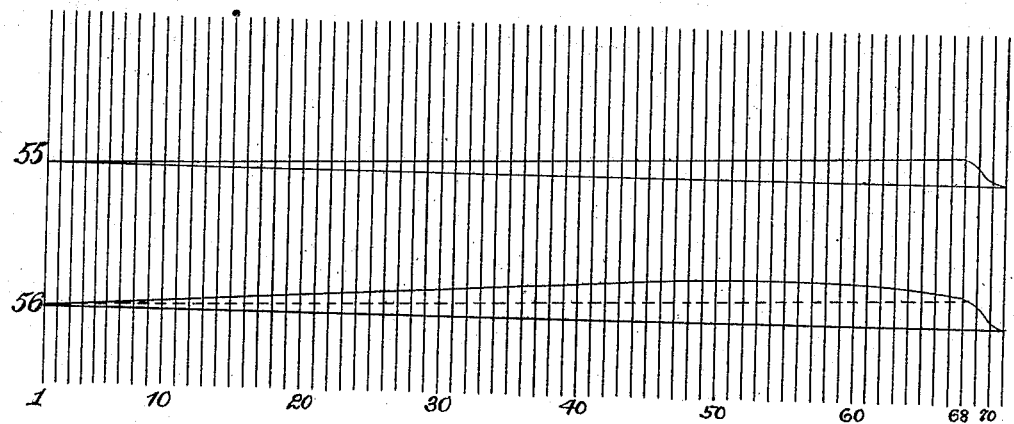

F. H. RICHARDS.
MECHANISM FOR MAKING TYPE AND TYPE BARS.
APPLICATION FILED MAR. 11, 1903. RENEWED JULY 12, 1910.

976,920.

Patented Nov. 29, 1910.

7 SHEETS—SHEET 5.

Witnesses:

Inventor;

F. H. RICHARDS.
MECHANISM FOR MAKING TYPE AND TYPE BARS.
APPLICATION FILED MAR. 11, 1903. RENEWED JULY 12, 1910.

976,920.

Patented Nov. 29, 1910.

7 SHEETS—SHEET 6.

Witnesses:

Inventor,

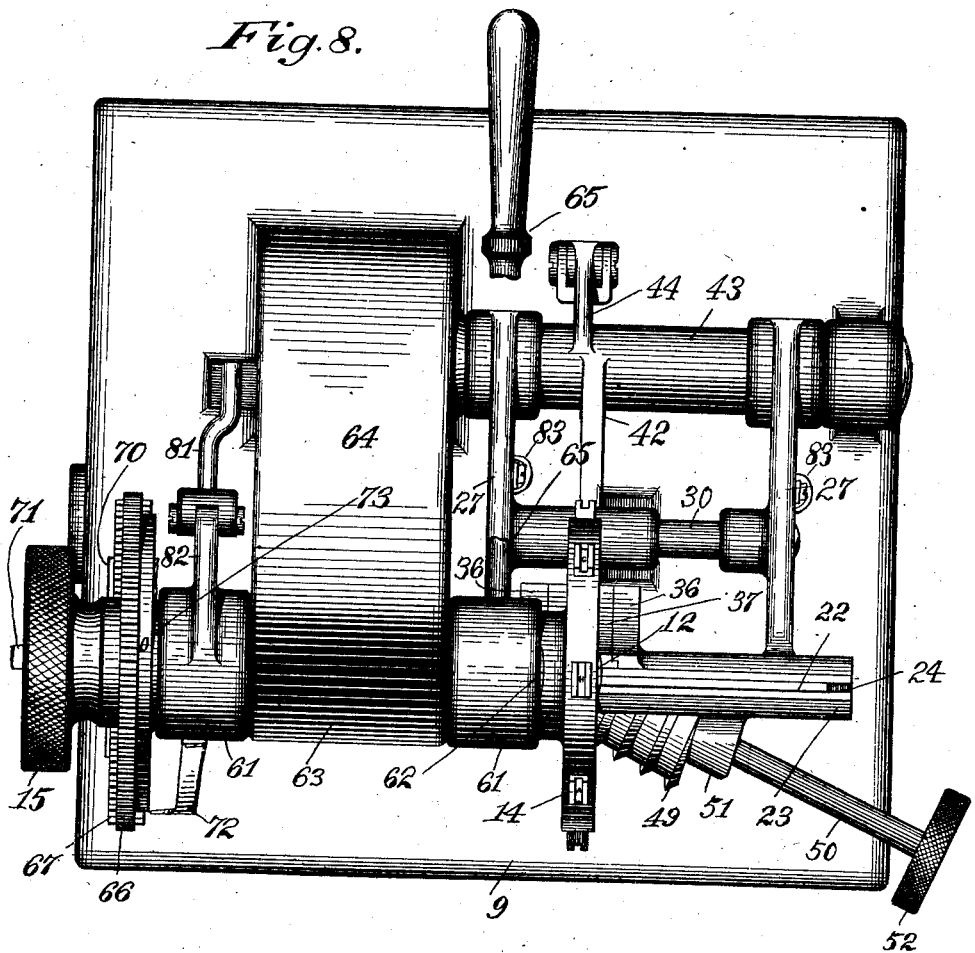

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF ARIZONA TERRITORY.

MECHANISM FOR MAKING TYPE AND TYPE-BARS.

976,920.           Specification of Letters Patent.      Patented Nov. 29, 1910.

Application filed March 11, 1903, Serial No. 147,219. Renewed July 12, 1910. Serial No. 571,658.

*To all whom it may concern:*

Be it known that I, FRANCIS H. RICHARDS, a citizen of the United States, residing at Hartford, in the county of Hartford and State of Connecticut, have invented certain new and useful Improvements in Mechanism for Making Types and Type-Bars, of which the following is a specification.

This invention relates to mechanism for making types either singly or in the close relation exhibited in a line of type or a typebar.

In the fashioning of blanks by machines it has been found desirable in practice to advance the blank and die toward each other, or to advance one of them, with strong pressure, causing the metal or material of the blank to be pressed into the cavities of the die and form impressions corresponding to the cavities of the die, and while such pressure is going on to bring into use auxiliary appliances for applying pressure in the region of the die. The mechanism may be constituted so that the blank will be supported by a holder and advanced with strong pressure toward the die and the auxiliary appliance mounted adjacent to the position occupied by the blank, which auxiliary appliances may conveniently be supported by the carriage and move at a rate of speed faster than that at which the blank is being moved, whereby the pressure exerted will gradually displace the metal or material of the blank, enabling it to be perfectly impressed in the die cavities, during which pressure a relative oscillation may be produced between the blank and die at the impression point. The present improvement in mechanism is adapted for producing these beneficial results in the fashioning of blanks, and as herein illustrated the mechanism is adapted for producing typebars.

Figure 1:
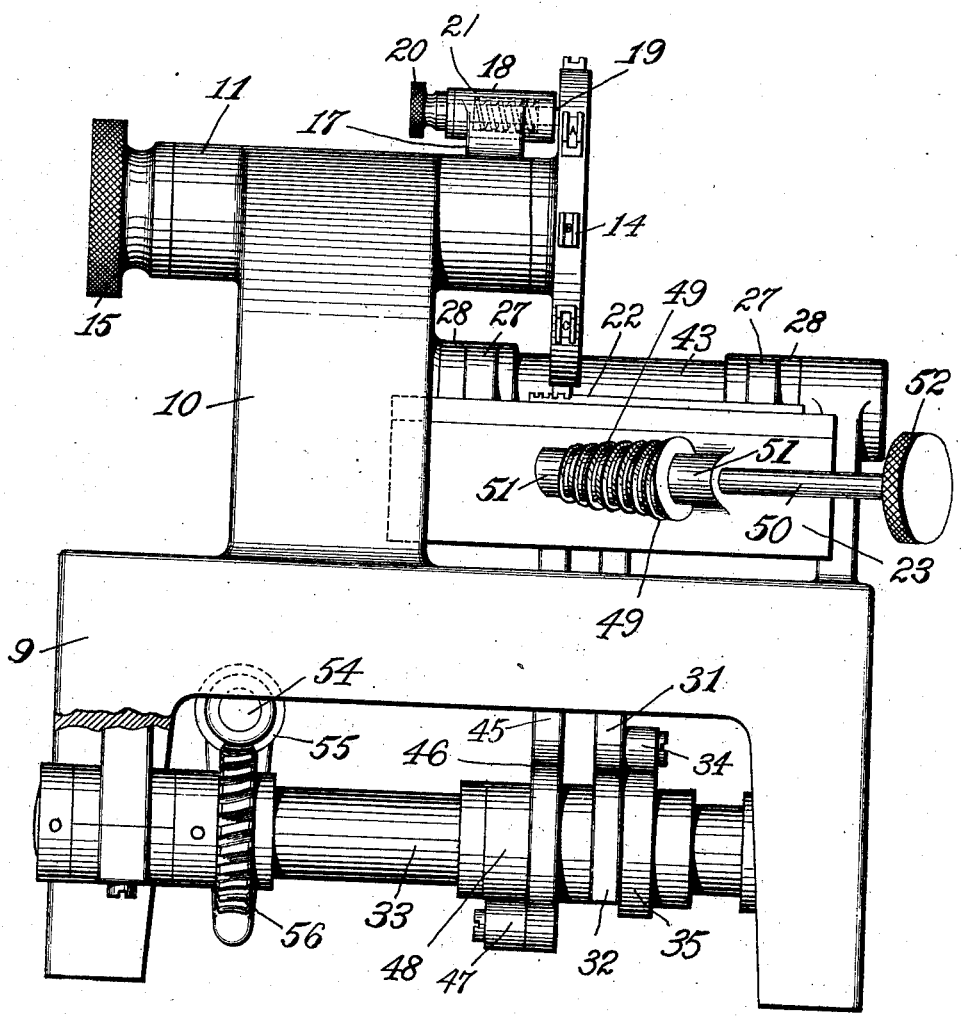
Figure 2:
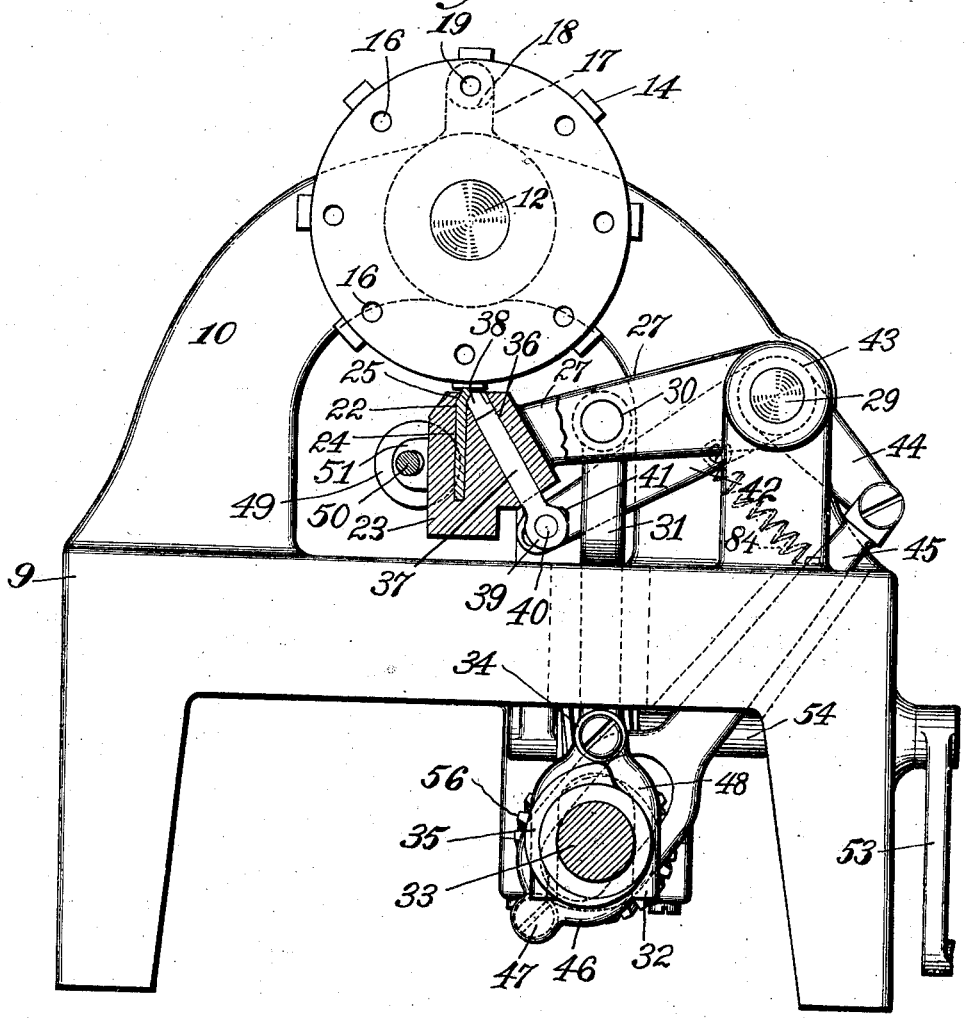
Figure 6:
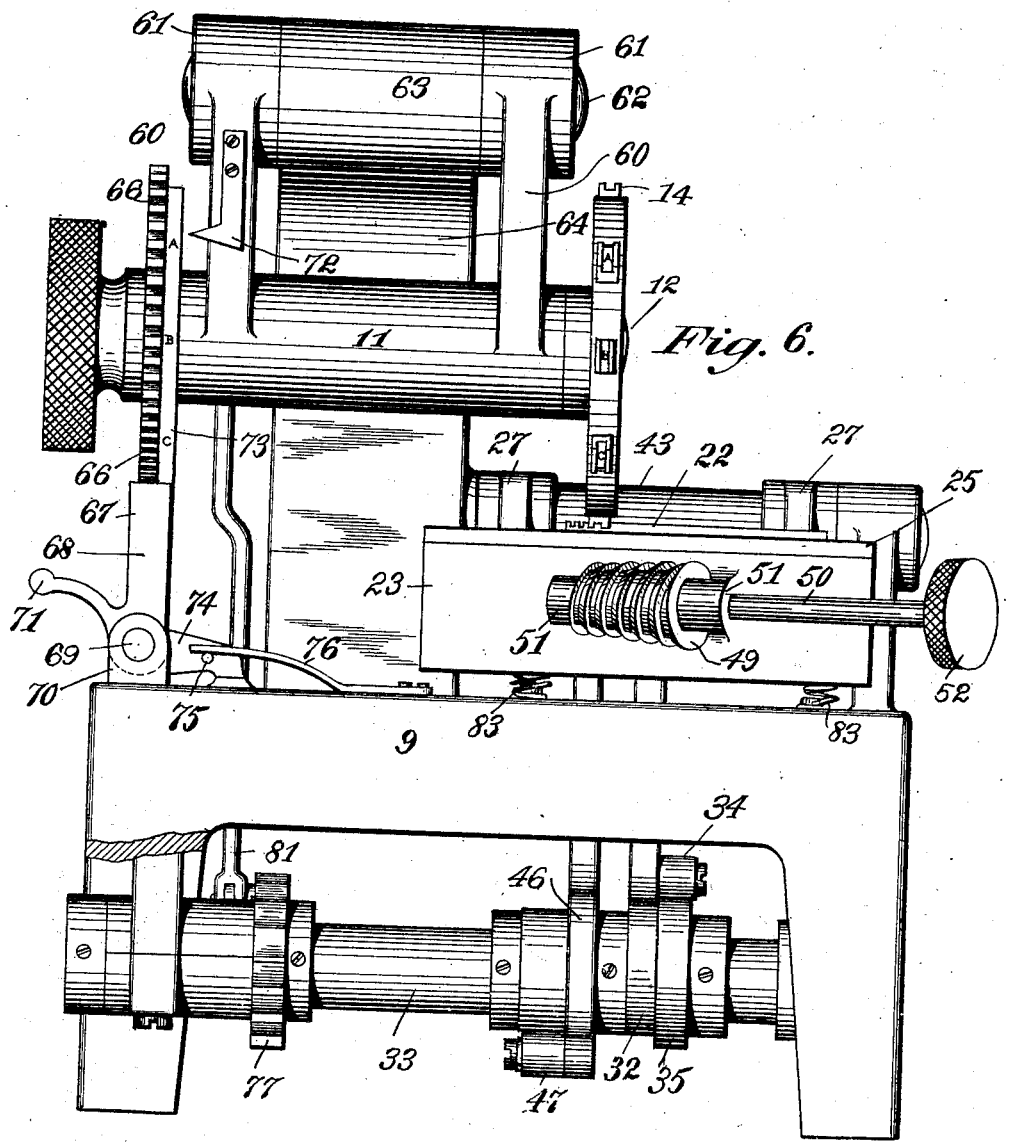
Figure 7:
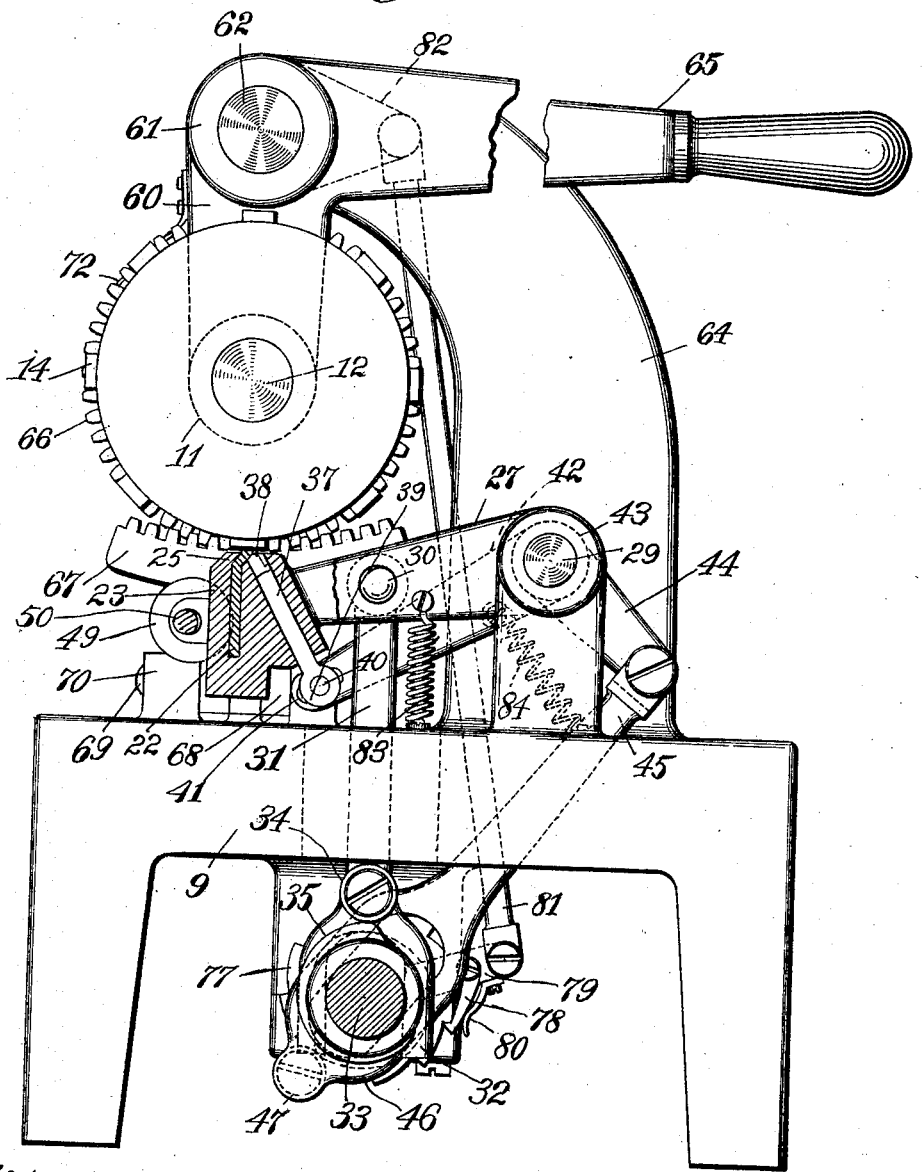

In the drawings accompanying and forming part of this specification, Figure 1 is an end elevation, partly broken away, illustrating a form of my invention. Fig. 2 is a front view of the same, some parts shown in longitudinal section, Fig. 3 is a top view. Fig. 4 is a perspective of a portion of a blank-holder and auxiliary presser. Fig. 5 is a diagrammatic development of the cams or drivers, and Figs. 6, 7 and 8 are views corresponding to Figs. 1, 2 and 3 showing another form of the invention.

The working parts are shown as mounted upon a frame 9, which is provided with an arched standard 10 carrying an elongated journal bearing 11 for supporting the shaft 12 of a die-carrier 13, which in the present instance is in the form of a disk provided at its periphery with a series of dies 14, eight dies being shown in the present instance for the purpose of illustration. The shaft 12 has mounted thereon a knurled hand wheel 15 for use in adjusting the carrier to locate a chosen die at the working point. The carrier is provided with a hole or recess 16 corresponding to each die, and mounted upon the journal 11 is a standard 17 carrying an elongated sleeve-like journal 18 in which is a bolt 19 organized to engage with the holes or recesses 16, which bolt is provided at its end with a handle 20 for the purpose of withdrawing the same, some suitable means being employed for returning the bolt to its locked position, here shown as a spiral spring 21 engaging a head on the bolt and located within the bearing 18.

The work of the machine is here shown as being a type-bar-blank 22, which in the present instance is supported by a blank-holder 23 having a groove 24 constituting a pocket for receiving the major portion of the blank. At the edge of such groove the walls thereof are inclined toward one side, so that there is provided an overhanging wall or face 25 in the nature of an anvil and a wall or face 26 sloping away from the groove. Such shaped groove will be organized to accommodate a blank which has a bend in it lengthwise. The holder in the present instance is mounted upon a pair of arms 27 having hubs 28 mounted upon a shaft 29 supported in bearings in the machine frame. For the purpose of advancing the blank toward the die a short shaft 30 is shown as connecting the arms 27, to which shaft is pivoted a link 31 having a forked end 32 embracing a driver-shaft 33. The link carries a roll 34 riding upon a driver upon the shaft consisting in the present instance of a cam-wheel 35, whereby upon the rotation of the shaft the blank-holder will be advanced toward the die-carrier and upon a sufficient advance of the holder the blank will be squeezed against the die and the material thereof forced into the cavities of the die. The holder is shown provided upon its side with ways 36 in which is mounted a slide 37 having a plain die 38 at its upper edge. The ways 36 are shown at an angle to the groove 24. Upon the end of the slide 37 opposite the die is a pair of eyes 39 receiving a pivot pin 40 which passes through an elongated opening 41 in an arm 42 secured to a sleeve 43 mounted upon the shaft 29. The sleeve 43 is also provided with an arm 44 to which is pivoted a link 45 having a yoke 46 embracing the driver-shaft and provided with a roll 47 running upon the driver on such shaft, in the present instance shown as a cam-wheel 48 and organized to advance the slide 37 at an accelerated speed during the advance of the blank-holder. The die 38 will engage the offset portion of the blank and will press it against the overhanging wall 25 and against the die. This pressure will not only induce a perfectly formed impression upon the blank, but will also produce a typebar which is not reversible, thereby affording greater facility in the making up of a form of prepared bars.

Suitable means may be employed for advancing the blank after each impression, which in the present instance is shown as a feed-screw 49 mounted upon a shaft 50 having bearings 51 on the blank-holder. The shaft 51 is provided with a head 52 for the purpose of rotating the screw to advance the blank.

The driving-shaft 33 may be rotated by any convenient means, here shown as a hand-crank 53 mounted upon a shaft 54 provided with a spiral gear-wheel 55 meshing with a corresponding spiral gear-wheel 56 fast upon such driving-shaft. It will be seen, especially by reference to Fig. 2, that the link 31 for advancing the blank is applied nearer the blank-carrying groove than to the center of the shaft 29 and that the arms or levers for advancing the coöperative die 38 are so organized that the link 45 is operative upon the short end of the lever, whereby the same throw of cam will cause a much greater movement of the slide 37 of the coöperative die than the movement imparted to the blank-holder, although the excess of movement of the coöperative die will not in most instances greatly exceed that of the blank.

In the diagrammatic development of the cams in Fig. 5 the line 55 represents the cam face of the driver 35 and the line 56 represents the cam face of the driver 48. The dotted line under line 56 corresponds to the line 55. Thus it will be seen that the driver for advancing the holder has a substantially straight line of advance, that is, from the line one to line 68 the advance will be constant. The line of advance of the face of the cam 48 is greater than that of the cam 35 up to about the line 40, when it gradually falls, from which line to about the line 55 the difference of advance is not so pronounced, and from such line to the line 68 or where the drop face of the cam is the line of this latter cam, falls away or toward the line of the former cam. By this organization the advance of the universal or auxiliary die 38, and consequently the advance of a portion of the blank acted upon will be at a constant accelerated ratio to the advance of the blank-holder and the balance of the blank. The accelerated movement, however, ceases prior to the withdrawal of the blank from the forming die, to the end that a square or accurate face may be made upon the type head and that such type head will not be distorted by the universal die after the blank has been withdrawn from the support of the forming die.

In some applications it may be desirable in fashioning the blank to impart a relative oscillation between the blank and die, to carry out which feature the device illustrated in Figs. 6, 7 and 8 will make the same possible. In this instance the shaft 12 will have its elongated bearing 11 carried by arms 60 which have hubs 61 embracing a shaft 62 supported by a bearing 63 in a horn or standard 64 of the machine frame.

One of the hubs is shown provided with a hand-lever 65. Mounted upon the shaft 12 is a spur-wheel 66 and adjacent to such spur-wheel is a sector 67 normally constituted to mesh with such spur-wheel. The sector is shown as mounted upon the rocker 68 pivoted at 69 to eyes 70 of the machine frame. The rocker is provided with a handle 71 for moving it into and out of mesh with the gear-wheel, it being necessary to move it out of gear upon the locating of a chosen die. One of the arms 60 is provided with a pointer 72 registering with exponents 73 carried by a flange on the gear-wheel 66 which will indicate the location of the selected die. The rocker is provided with an arm 74 having a pin 75 engaged by a leaf spring 76 for returning the sector to its meshing position. By this organization the die may be oscillated during the pressure of the blank against it, so that the formation of the impression upon the blank may be more complete. In this instance the driving-shaft 33 is organized to be driven by means controlled by the oscillating device to the end that in the formation of an impression upon the blank in each instance the die will be given the same number of oscillations, to which end a ratchet-wheel 77 is secured to the driving shaft 33 and a pawl 78 is carried by an arm 79 embracing the shaft 33, a suitable spring 80 being employed for holding the pawl in engagement with the ratchet. A link 81 connects the arm 79 with an arm 82 secured to one of the hubs 61. Upon each depression of the hand-lever 65 in giving an excursion to the die the pawl will be fed forward over the ratchet, and upon raising the hand-lever to give the die an excursion in the opposite direction the pawl will rotate the wheel and cause the advance of the drivers, in the present instance the cams, and cause the same to work.

By this organization the advance of the blank, both the normal advance of the entire blank and the auxiliary accelerated advance, will be step by step and one excursion of oscillation will be while the blank remains in a temporarily stationary position and the reverse excursion of oscillation will be while both such advances are taking place. Suitable means may be employed for returning the parts to their various normal positions, there being shown in the present instance a spiral spring 83 for returning the blank-holder and a spiral spring 84 for returning the auxiliary presser or die.

For the purpose of illustration, the machine is here shown as manually controlled in all its parts, yet it will be apparent that this form has been adopted for convenience in illustrating, which in practice may be employed in such surroundings that the application of power or other means for controlling the various parts of the device may be otherwise applied.

Having thus described my invention, I claim—

1. The combination with a die of a holder having work feeding means operative upon the holder to bring the die and work into engagement, and means to act upon the work auxiliarily to and in excess of the feed of the holder.

2. The combination with a die of means to feed the work thereto, and means to act upon a portion of the work to advance such portion in excess of the feed.

3. The combination with a die, of a holder having work feeding means operative upon the holder to bring the die and work into engagement, and means to act upon the work in excess of the feed of the holder.

4. The combination with a die, of means for advancing a blank bodily in the general direction of the die, and means for advancing a portion of the blank in the direction of the die.

5. The combination with a series of dies, of means for shifting a selected die into the working position; a blank-carriage; means for advancing the carriage for advancing a blank carried by the same against the die; a coöperative die carried by the carriage; and means for advancing the same against the blank during the advance of the carriage.

6. The combination with a number of dies, of means to shift a chosen die to the working position; a carriage for a blank provided with a channel to hold the major portion of the blank; a face overhanging such channel; a face sloping away from such channel; and a die carried by the carriage and organized to engage the portion of the blank held between such overhanging face and the sloping face.

7. The combination with a die, of means to hold a blank; means to bring the blank and die into impressing engagement; means to cause relative oscillation between the die and blank at the point of impression; and means to localize and accentuate the pressure between the blank and the die.

8. The combination with a die, of a blank-holder; means to press the blank and die together; and a coöperative die carried by the holder and organized to accentuate the pressure upon the blank in the region of the die.

9. The combination with a series of forming dies; a rotary carrier on which the dies are mounted; means for locating a chosen die at the working position; a die-carriage having a channel for the reception of a blank, a portion of which channel is at an angle to the remainder thereof; a coöperative die carried by the carriage and organized to engage the blank near its edge; means for advancing the carriage; means controlled by said advancing means for advancing the coöperative die; an oscillatory arm carried by the die-carrier; a spur-wheel upon the carrier; a sector adjacent thereto; means for oscillating said arm to oscillate the dies; and means controlled by said oscillatory arm for actuating the means for advancing the carriage and coöperative die.

10. The combination with a series of dies, of a carrier therefor; a spur-wheel connected to the carrier; a rock-shaft; an arm supporting the die-carrier and connected with the rock-shaft; means for rocking said shaft; a sector adjacent to the spur-wheel; a blank-carrier comprising a block provided with a groove substantially perpendicular to the general working face of the die and having the portion of such groove for the part of the blank adjacent to the head at an angle to the portion for holding the body of the blank; a shaft; a pair of arms loose on the shaft and secured to such die-carrier; a link dependent from the arms; a driver-shaft; a cam thereon to throw such link; a coöperative die mounted upon the carriage and organized to engage the blank adjacent to the part held in the angular portion of the groove; a sleeve upon said shaft; an arm secured to the sleeve and organized to actuate said coöperative die; a link; an arm fast on the sleeve and coupled to the link; a cam upon the driver-shaft organized to throw such link; a ratchet-wheel upon said driver-shaft; and a pawl controlled by the rock-shaft supporting the die-carrier.

11. The combination with a die, of means to advance a blank toward the die; and means to apply pressure to one side of the blank at an angle to the face of the die and to the line of advance of the blank.

12. The combination with a die, of means to advance a blank toward the tie in a line substantially perpendicular to the normal face of the die; means to apply pressure upon a line at an angle thereto to one side of the blank; and means to oscillate the die during such application of pressure.

13. The combination with a die, of a blank carriage; means for advancing the carriage toward the die; a coöperative die carried by the blank carriage for forcing the blank against said die, and means controlled by the advancing means of the carriage for actuating the coöperative die.

14. The combination with a series of dies; a rotary carrier on which the dies are mounted; means for locating a chosen die at the working position; a blank-carriage having a channel for the reception of a blank, a portion of which channel is at an angle to the remainder thereof; a coöperative die carried by the carriage and organized to engage the blank near its edge; means for advancing the carriage; means controlled by said advancing means for advancing the coöperative die; an oscillatory arm carrying the die-carrier; a spur-wheel upon the carrier; a sector adjacent thereto; and means for oscillating said arm to oscillate the dies.

15. The combination with a die, of means to hold a blank; means to shift the holding means to press the blank against the die and force the metal of the blank into the cavity of the die; and auxiliary means to press the metal of the blank at an angle to the pressure incident to the shift of the holding means and cumulative to such pressure.

16. The combination with a die, of means for forcing the substance of a blank into the cavities of the die, and means operative upon the blank at an angle to the general line of action of said forcing means to force a portion of the blank at greater pressure than the rest of the blank.

17. The combination with a die, of means to advance a blank toward the die, and means to advance a portion of the blank at an accelerated rate of speed.

18. The combination with a die, of means to hold a blank having an offset portion; means to advance the edge of such offset portion against the die; and means to apply pressure to the juncture of offset toward the general plane of the blank and toward the die.

19. The combination with a die, of means to gradually advance a blank toward the die and rapidly withdraw the same therefrom; auxiliary means to advance a portion of the blank; and means to actuate the same at a greater rate of speed than the blank and to withdraw said auxiliary means prior to the withdrawal of the blank.

20. The combination with a die, of a blank-carrier, means to advance the blank-carrier toward the die; means to oscillate the die during the advance of the blank-carrier; and means controlled by the oscillating means to actuate the advancing means.

21. The combination with a series of dies, of a rotary carrier therefor; a spur-wheel fast to the carrier; a sector to gear with such spur-wheel; means to shift the sector into and out of gear therewith; and means to oscillate the carrier.

22. The combination with a blank-holder; arms supporting the blank-holder; a shaft on which the arms are mounted; a bar connecting the arms; a link pivoted thereto; means to throw the link; ways upon the holder; a die having guide surfaces shiftable in such ways; a sleeve upon said shaft; a lever carried by the sleeve and having one end engaging the die; a link pivoted to the other end; and means controlled by the means for throwing said former link to throw the latter link in an opposite direction.

23. The combination with a working tool, of means to gradually advance a blank toward the die and withdraw the same therefrom; auxiliary means to act upon a portion of the blank adjacent to the tool; and means to actuate said auxiliary means and to withdraw the same prior to the withdrawal of the blank.

24. The combination with a die, of means to advance a blank toward the die; means to oscillate the die during the advance of the blank; and means actuated by the oscillating means to control the advance of the blank.

25. The combination with a series of tools, of a carrier therefor; an axle upon which the carrier is mounted; a spur-wheel mounted upon the axle; a sector organized to gear with the spur-wheel; means to shift the sector into and out of gear therewith; an oscillatory support for the axle; and means to oscillate the support.

26. The combination with a blank holder; of a shaft; arms to support the blank holder mounted on the shaft; a link pivoted to the arms adjacent to the blank-holder; ways upon the holder; a die having guide surfaces shiftable in such ways; a sleeve upon said shaft; a lever carried by the sleeve and having its longer end pivoted to the die; a link pivoted to the other end of the lever; and interdependent means to throw the links.

27. A blank-holder for a typographic-machine embracing a body provided with a groove having a considerable portion thereof situated upon one plane and a portion thereof at an angle to such plane.

28. A blank-holder for a typographic-machine consisting of a block having a groove or pocket, the walls at the edge of such groove occupying a plane at an angle to the plane of the major portion of the walls of such groove whereby one wall overhangs the major portion of the groove and the other wall slopes away from the same.

29. A blank-holder for a typographic-machine consisting of a block having a groove or pocket, the walls constituting the edge of such groove occupying a plane at an angle to the plane of the major portion of the walls of such groove whereby one wall overhangs such portion of the groove and the other walls slopes away from the same; ways on the holder at the side toward which the walls of the groove incline; a slide mounted in such ways; and a die carried by the slide and organized to engage a blank occupying the groove at a point adjacent to the edge thereof.

30. The combination with a working tool, of a blank-holder consisting of a block having a groove or pocket, the walls constituting the edges of such groove occupying a plane at an angle to the plane of the major portion of the walls of such groove whereby one wall overhangs such major portion of the groove and the other wall slopes away from the same; means to advance the holder toward the die; an auxiliary die; and means to shift the same toward the overhanging wall.

31. The combination with a blank-holder provided with means to hold a blank in a determined plane, of a shaft; arms to support the blank-holder and mounted on the shaft; a link pivoted to the arms adjacent to the blank-holder; ways upon the holder at an angle to the plane in which the blank may be held; a slide shiftable thereon; a die carried by the slide; a sleeve upon said shaft; a lever carried by the sleeve and having in its longer end a slot; a pin carried by the slide and in the embrace of the slot; a link pivoted to the other end of the lever; and interdependent means to throw the links in different directions.

32. The combination with a die, of means for holding a blank; means for advancing a blank held thereby against the die; means for oscillating the die; and means controlled by the excursions of oscillation in one direction to advance the blank during such excursions.

33. The combination with a die, of a blank-holder; means for oscillating the die; and means controlled by the oscillating means for advancing the holder toward the die during the excursions in one direction of the oscillations.

34. The combination with a die, of a blank-holder; means to oscillate the die; means for advancing the blank-holder step by step toward the die; and means actuated by the oscillating means for controlling the advancing means of the blank-holder.

35. The combination with a die, of a blank-holder; means to oscillate the die; means for advancing the blank-holder step by step toward the die; means actuated by the oscillating means for controlling the advancing means of the blank-holder; means for advancing a portion of the blank in excess of the blank generally; and means controlled by the said controlling means for advancing the same step by step contemporaneously with the advance steps of the blank.

36. The combination with a series of work-performing members of means for shifting a selected work-performing member into working position, a work-carrying member, means for advancing the work against the work-performing member, a coöperative work-performing member, and means for advancing the same against the work during the advance of the carrier.

37. The combination with a series of work-performing members of means to shift a chosen work-performing member to a working position, a carriage for the work provided with a channel to hold the major portion thereof, a face overhanging such channel, a face sloping away from such channel, and a work-performing member carried by the carriage and organized to engage the portion of the work held between such overhanging face and such sloping face.

38. The combination with a series of work-performing members of means to shift a chosen work-performing member to the working position, a work carrier provided with means to hold the major portion of the work, and a work-performing member carried by the carrier and organized to engage the portion of the blank held by the holding means.

39. The combination with a work-performing member of means to hold the work means to bring said member and work into operative engagement, means to cause relative oscillation between the work and work-performing member at the point of operative engagement, and means to localize and accentuate such coöperative engagement between the work and the work-performing member.

40. The combination with a work-performing member of a work holder, means to bring the work and the work performing member together, and a coöperative work-performing member carried by the work carrier and organized to accentuate the pressure upon the work in the region of the work-performing member.

41. The combination with a series of work-performing members, a rotary carrier on which said members are mounted, means for locating a chosen member in the working position, a work-performing member, a carriage provided with means for the reception of the work, a coöperative work-performing member carried by the carriage and organized to engage the work at a suitable point, means for advancing the carriage, means controlled by said advancing means for advancing the coöperative work-performing member, an oscillatory arm carried by the work-performing member carrier, a spur wheel upon the carrier, a sector adjacent thereto, means for oscillating said arm to oscillate the work-performing members, and means controlled by said oscillatory arm for actuating the means for advancing the carriage and coöperative work-performing member.

42. The combination with work-performing member of means to shift the work toward the performing member, and means to apply pressure to the work at an angle to the work-performing member and to the line of advance of the work.

43. The combination with a die, of means whereby the work and die may have a relative movement and means to act upon the work to advance it in excess of the movement.

44. The combination with a work-performing member, of means for moving the member and a blank relatively, and means for advancing a portion of the blank in a direction opposite to the said relative movement.

45. The combination with a work-performing member, of means for shifting the same into working position, a work-carrying member, means for advancing the work against the work-performing member, a coöperative work-performing member, and means for advancing the same against the work during the advance of the carrier.

46. The combination with a series of work-performing members, of means for shifting a chosen work-performing member to a working position, means for holding the work and provided with a portion for holding the major portion thereof, a face overhanging such portion, a face sloping away from such portion, and a work-performing member carried by the carriage and organized to engage the portion of the work held between such overhanging face and such sloping face.

47. The combination with a series of selective work-performing members, of means for shifting a selected work performing member to a working position, a work carrier provided with means for holding the work, and a work-performing member carried by the carrier and organized for engaging the blank.

48. The combination with a work-performing member, of means to hold the work, means to bring said member and work into operative engagement, means to cause relative movement between the work and work-performing member, and means to accentuate such coöperative engagement between the work and the work-performing member.

49. The combination with a work-performing member, of a work holder, means to bring the work and the work performing member together, and a coöperative work-performing member organized to accentuate the pressure upon the work.

50. The combination with a series of selective work-performing members, a carrier on which said members are mounted, means for locating a chosen member in the working position, a member provided with means for the reception of the work, a coöperative work-performing member carried by the member and organized for engaging the work at a suitable point, means for advancing the member, means controlled by said advancing means for advancing the coöperative work-performing member, a member carried by the work performing member, an oscillatory arm carried by the work-performing member carrier, a spur wheel upon the carrier, a section adjacent thereto, means for oscillating said arm to oscillate the work-performing members, and means controlled by said oscillatory arm for actuating the means for advancing the member and coöperative work-performing member.

51. The combination with a work-performing member, of means to cause a relative movement of the work and the work-performing member, and means to create pressure between the work and member at an angle to the work-performing member and to the line of advance of the work.

52. The combination with a working-tool, of a work-holder, feeding means operative upon the holder for bringing the tool and work into working engagement, and auxiliary means for acting upon the work in excess of the feed of the holder.

53. The combination with a working-tool, of feeding means, and means to act upon a portion of the work in excess of the feed.

54. The combination with a die, of a blank carriage, means for advancing the carriage and die relatively, and means carried by the carriage for squeezing a portion of the blank carried thereby against the die.

55. The combination with a die, of means to advance a blank bodily in the general direction of the die, and means to advance a portion of the blank in the direction of the die.

56. The combination with a die, of means for shifting said die into the working position, a blank carriage, means for advancing a blank carried by the same against the die, a coöperative die carried by the carriage, and means for advancing the same against the blank during the advance of the carriage.

57. The combination with a number of dies, of means to shift a chosen die to the working position a carriage for a blank provided with a channel to hold the blank an overhanging portion of such channel, a portion extending away from such channel, and a die carried by the carriage and organized to engage the portion of the blank held between such overhanging portion and the extending face.

58. The combination with a die, of means to hold a blank, means to bring the blank and die into impressing engagement, means to cause relative movement between the die and blank at the point of impression, and means to accentuate the pressure between the blank and the die.

59. The combination with a die, of a blank holder, means to press the blank and die together, and a coöperative die carried by the holder and organized to localize the pressure upon the blank in the region of the die.

60. The combination with a die, of means to advance a blank toward the die, and means to apply pressure to the blank at an angle to the face of the die and to the line of advance of the blank.

61. The combination with a die, of means to advance a blank toward the die in a line substantially perpendicular to the normal face of the die, means to apply pressure upon a line at an angle thereto, to one side of the blank, and means to move the die during such application of pressure.

62. The combination with a die, of a work holder, feeding means operative upon the holder for bringing the die and work into working engagement, and auxiliary feeding means for acting upon a portion only of the work in the holder.

63. The combination with a die, of a blank holder provided with an anvil, means for feeding the holder toward the die, and means carried by the holder for pressing a portion of the blank against the anvil and the die.

64. The combination with a series of dies, of means for shifting a selected die into the working position a blank holder, means for advancing a blank held by the same against the die, a coöperative die, and means for advancing the coöperative die against the blank during the advance of the said blank.

65. The combination with a die, of a blank holder, means for advancing the carriage toward the die, a die carried by the blank carriage for forcing a portion of the blank against said die, and means for actuating the said die.

66. The combination with a die, of a blank holder having an overhanging face, means for advancing the holder toward the die, and a die movable toward said former die and overhanging face.

67. The combination with a die, of a blank holder provided with an anvil face, and means for pressing a portion of a blank in said holder toward said die and anvil face.

68. The combination with a die, means for feeding a blank, an anvil, and means for forcing a portion of the blank toward said die and anvil.

69. The combination with a die, of means for feeding a blank, an anvil, and means for forcing a portion of said blank toward said die and anvil at an angle to the normal plane of feed.

Signed at Nos. 9–15 Murray st., New York, N. Y., this 9th day of March, 1903.

FRANCIS H. RICHARDS.

Witnesses:
   FRED. J. DOLE,
   JOHN O. SEIFERT.